Feb. 16, 1926. 1,573,757
ST. ELMO W. ACOSTA
FLAG HOLDER
Filed June 29, 1925
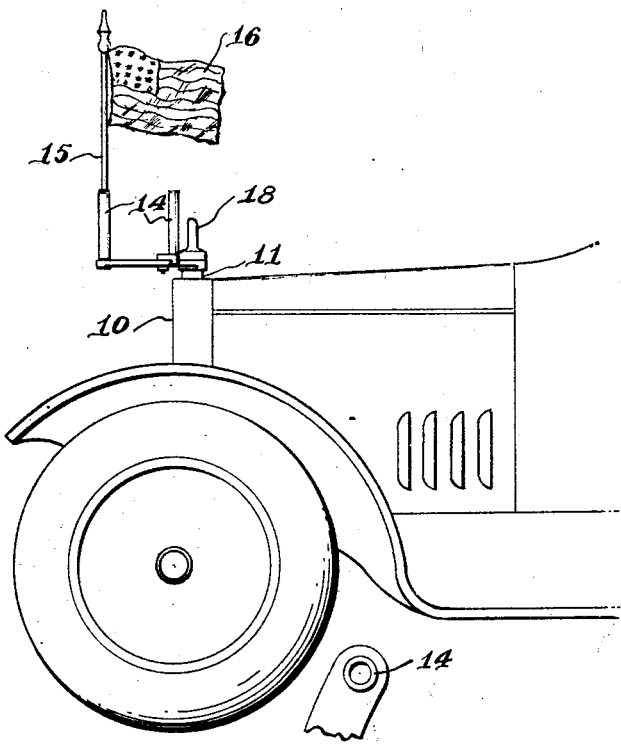
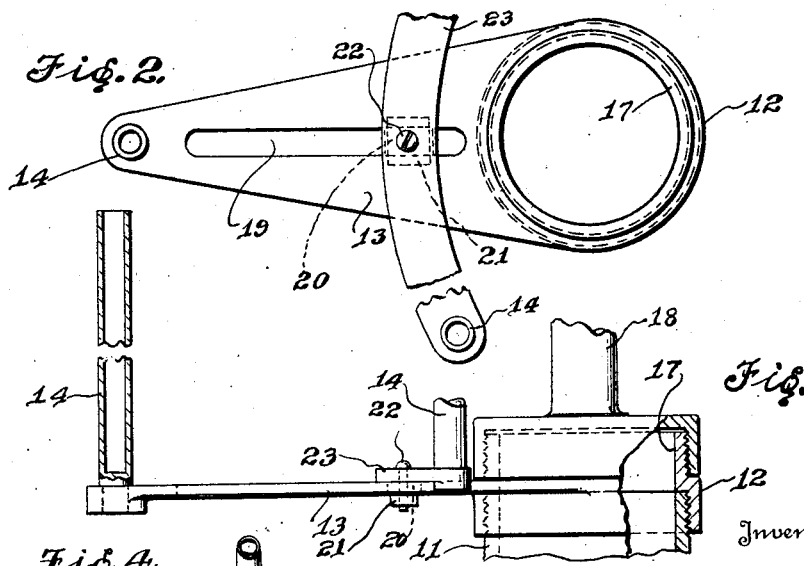
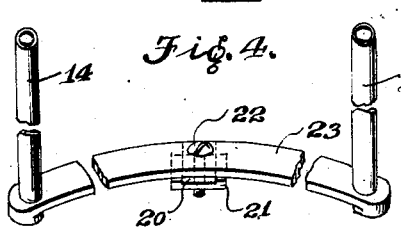
Inventor
St. Elmo W. Acosta
By
Attorney Patented Feb. 16, 1926.

1,573,757

UNITED STATES PATENT OFFICE.

ST. ELMO W. ACOSTA, OF JACKSONVILLE, FLORIDA.

FLAG HOLDER.

Application filed June 29, 1925. Serial No. 40,407.

*To all whom it may concern:*

Be it known that I, ST. ELMO W. ACOSTA, a citizen of the United States, residing at Jacksonville, in the county of Duval and State of Florida, have invented certain new and useful Improvements in Flag Holders, of which the following is a specification.

My said invention relates to a flag holder for automobiles and it is an object of the same to provide a device of this character which may be attached to any automobile, without interfering with other parts, which shall be strong and durable and which shall hold a flag securely in place.

Referring to the accompanying drawings which are made a part hereof and on which similar reference characters indicate similar parts, Figure 1 is a side elevation of a part of an automobile with my device in place thereon, Figure 2, a plan of the device of my invention, Figure 3, a side elevation of the same with parts in section, and Figure 4, a perspective of an attachment.

In the drawings reference character 10 indicates the radiator of an automobile of any conventional or desirable type, this radiator being supplied with the usual nipple 11 adapted to be closed by a cap. According to my invention I have removed the conventional cap and substituted therefor a nut 12 here shown as internally threaded to fit the external threads on the nipple. It will be understood that in cases where the radiator cap is externally threaded the attachment would have internal threads and that the attachment may be varied in other obvious respects, such as size and color. Preferably the attachment is made of brass or bronze which will not rust and will hold its shape but other materials may be used if desired. The nut 12 has at one side an arm 13 here shown as projecting forward from the machine but which may project in other directions if desired. Adjacent its end the arm 13 has a tube 14 mounted thereon, this tube being closed at the lower end and open at the upper end to receive the staff 15 of a flag 16. The nut 12 has an upward extension 17 here shown as externally threaded to engage internal threads on a motometer indicated in conventional manner at 18. It will be understood that an ordinary cap may be attached to the nut 12 or any other conventional or desirable closure for the radiator may be located thereon.

In cases where it is desired to display more than one flag or other device an attachment such as shown in Fig. 4 may be added to the device. For this purpose a slot 19 is made in the part 23 and a block 20 is slidably mounted therein. A nut 21 is placed under block 20 or made integral therewith and a screw 22 having threaded engagement with nut 21 is inserted through a hole in a bar 23, here shown as of arcuate form. The bar 23 has tubes 14 at each end which tubes may be otherwise located or of other form as desired, and the bar is moved to desired position and secured in place by turning screw 22.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A flag support for use on automobiles comprising a threaded attachment to be substituted for the radiator cap, an arm extending laterally therefrom, and a tubular holder on the arm to receive a flagstaff said threaded attachment being open at the upper end and having threads to receive a cap or the like, substantially as set forth.

2. A flag support for use on automobiles comprising a threaded attachment to be substituted for the radiator cap, an arm extending laterally therefrom, a tubular holder on the arm to receive a flagstaff, a curved bar extending transversely of said arm with its ends curving away from said holder, and means on said bar for holding additional flag staffs said bar being adjustable along the arm, substantially as set forth.

3. The combination of an open collar threaded to be substituted for the radiator cap, a second threaded portion extending upward therefrom to receive the radiator cap, an arm extending outward from said collar, a tubular holder on said arm to receive a flag staff, a curved bar adjustably secured to said arm with its ends curving away from said tubular holder, and means on said bar for holding additional flag staffs, substantially as set forth.

In witness whereof, I have hereunto set my hand and seal at Jacksonville, Florida this 17th day of June, A. D. nineteen hundred and twenty-five.

ST. ELMO W. ACOSTA. [L. S.]